United States Patent
Shibazaki et al.

(10) Patent No.: US 9,285,513 B2
(45) Date of Patent: Mar. 15, 2016

(54) DISPLAY APPARATUS WITH SYMMETRIC DIFFUSION FILM

(71) Applicant: CHIMEI INNOLUX CORPORATION, Chu-Nan, Miao-Li County (TW)

(72) Inventors: Minoru Shibazaki, Chu-Nan (TW); Kazuyuki Hashimoto, Chu-Nan (TW); Yoshitaka Haruyama, Chu-Nan (TW)

(73) Assignee: INNOLUX CORPORATION, Jhu-Nan (TW)

(*) Notice: Subject to any disclaimer, the term of this patent is extended or adjusted under 35 U.S.C. 154(b) by 253 days.

(21) Appl. No.: 14/010,238

(22) Filed: Aug. 26, 2013

(65) Prior Publication Data
US 2013/0335943 A1 Dec. 19, 2013

Related U.S. Application Data

(63) Continuation-in-part of application No. 13/301,697, filed on Nov. 21, 2011, now Pat. No. 8,648,986.

(51) Int. Cl.
*G02B 5/02* (2006.01)
*G02F 1/1335* (2006.01)
*G06F 3/045* (2006.01)

(52) U.S. Cl.
CPC ............ *G02B 5/0278* (2013.01); *G02B 5/0242* (2013.01); *G02F 1/133504* (2013.01); *G06F 3/045* (2013.01)

(58) Field of Classification Search
CPC combination set(s) only.
See application file for complete search history.

(56) References Cited

U.S. PATENT DOCUMENTS

| 6,480,249 | B2 | 11/2002 | Iwata et al. | |
|---|---|---|---|---|
| 2002/0015123 | A1 | 2/2002 | Iwata et al. | |
| 2003/0002153 | A1 | 1/2003 | Hiraishi et al. | |
| 2005/0195345 | A1 | 9/2005 | Chiang et al. | |
| 2006/0166173 | A1* | 7/2006 | Ellis et al. | 434/185 |
| 2008/0007677 | A1* | 1/2008 | Enomoto | 349/106 |
| 2008/0123031 | A1 | 5/2008 | Homma et al. | |
| 2009/0002597 | A1 | 1/2009 | Watanabe | |
| 2011/0248936 | A1* | 10/2011 | Kim et al. | 345/173 |

FOREIGN PATENT DOCUMENTS

| CN | 101038391 | 9/2007 |
|---|---|---|
| CN | 101061424 | 10/2007 |
| CN | 201885083 | 6/2011 |
| CN | 103135152 | 6/2013 |

OTHER PUBLICATIONS

Foreign Office Action issued by the State Intellectual Property Office of the People's Republic of China, dated Aug. 1, 2014.
Foreign Office Action issued by the Taiwan Intellectual Property Office, dated Oct. 21, 2014.
Foreign Office Action issued by the State Intellectual Property Office of the People's Republic of China, dated Mar. 13, 2015.
Foreign Office Action issued by the Taiwan Intellectual Property Office, dated May 4, 2015.

* cited by examiner

*Primary Examiner* — Wen-Ying P Chen
(74) *Attorney, Agent, or Firm* — Liu & Liu

(57) ABSTRACT

A display apparatus at least comprises a touchscreen, and a symmetric diffusion film (SDF) disposed above the touchscreen. The SDF comprises at least two different materials, including a first material mixed with a second material. The first material has a first refractive index and the second material has a second refractive index, and the first refractive index is different from the second refractive index.

19 Claims, 9 Drawing Sheets

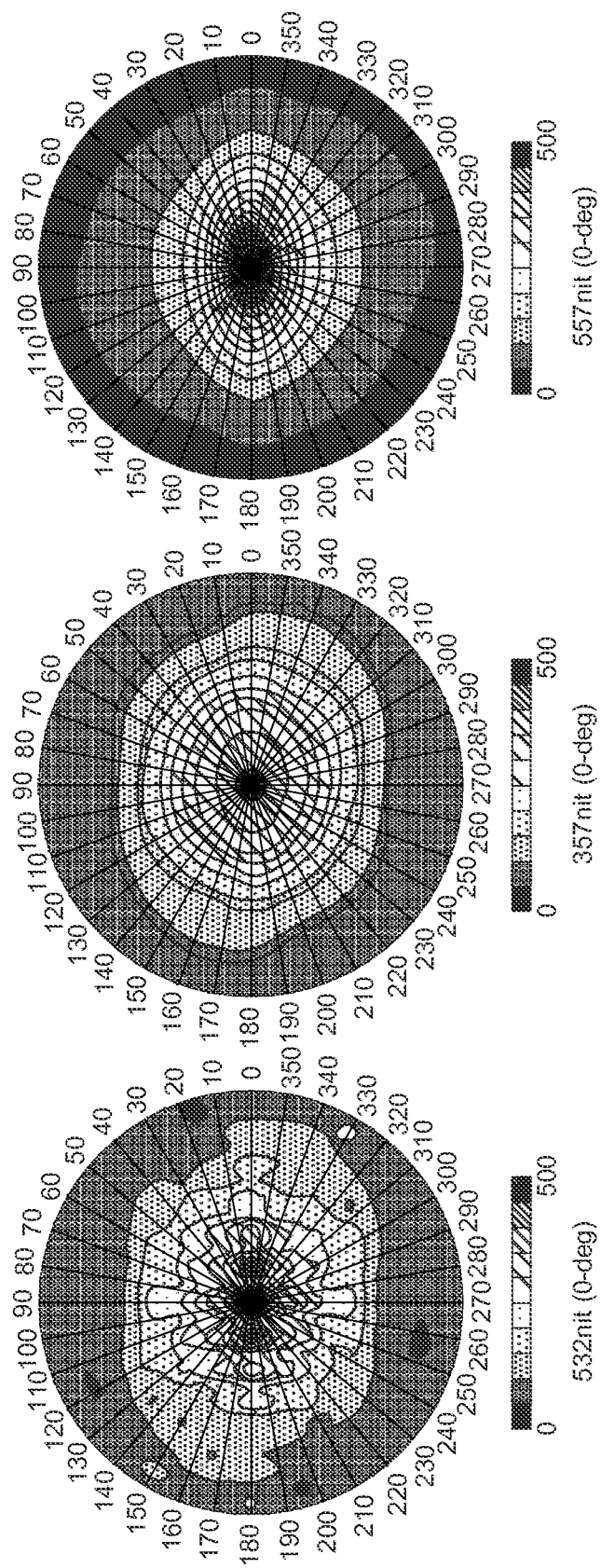

DISPLAY APPARATUS WITH SYMMETRIC DIFFUSION FILM

This is a continuation-in-part application of application Ser. No. 13/301,697, filed Nov. 21, 2011. The disclosure of this earlier application is incorporated herein by reference.

BACKGROUND

1. Technical Field

The disclosed embodiments relate in general to a display apparatus with a symmetric diffusion film, and more particularly to a display apparatus with a touch sensor and a symmetric diffusion film, which uniform the luminance distribution.

2. Description of the Related Art

Touchscreens are becoming widely used in electronic products, such as handheld devices (cell phone, PDA, . . . etc.), or tablet computers, to serve as input devices for the user. A touchscreen is an electronic display with a touch sensor able to detect the presence and location of a touch within the touch-sensitive area or the display area. The touch on the panel can be executed by a finger, a hand, or an object such as a stylus.

The four most common touch sensor technologies include resistive, infrared, capacitive and SAW (surface acoustic wave). Each technology offers its own unique advantages and disadvantages. Resistive and capacitive touch sensor technologies are the most popular for industrial applications due to their good reliability. The capacitive type touch sensor has advantages of a small touch force and can support multi-touch detection, while the resistive type touch sensor cannot determine where multiple points on a resistive type touch sensor be touched. However, the cost of a capacitive type touch sensor is high because of several photolithographic steps required in a manufacturing process, and the method for detecting and determining the locations of multiple touched points on a capacitive type touch sensor is complicated.

For touchscreens, the methods for integrating a touch sensor to a display panel include three different types of In-Cell touch, On-Cell touch, and Out-Cell touch. An In-Cell touch sensor is physically inside a display (ex:LCD) cell and the touch sensor can be light-sensing elements (light-sensing), micro-switches (voltage-sensing) and capacitive electrodes (charge-sensing). An On-Cell touch sensor is developed on a color filter substrate, for example, an X-Y array of conductors (ex: ITO or metal) on the top or bottom surface of the color filter substrate. An Out-Cell touch sensor is laminated directly on top of a display (ex:LCD) cell during manufacture.

Take In-Cell and On-Cell integrations for example, which one or more layers of sensing electrodes of touch sensor can be developed on a color filter substrate. FIG. 1 schematically illustrates a conventional touchscreen having a touch sensor integrated to a display panel. As shown in FIG. 1, a display panel typically includes a TFT glass substrate 11, a CF glass substrate 13, a liquid crystal (LC) layer disposed between the TFT glass substrate 11 and the CF glass substrate 13, and a backlight system 17 under the TFT glass substrate 11 for emitting the light forwardly. A black matrix layer 133 (ex: about 6 μm in width) can be further formed on the inner side of the CF glass substrate 13. The touchscreen of FIG. 1 comprises the touch sensor such as the sensing electrodes 19 (ex: metal electrodes, with a width smaller than 6 μm) positioned on the top of the CF glass substrate 13 and corresponding to the black matrix layer 133. Due to parallax effect in the thickness (such as 0.2 mm) of the CF glass substrate 13 and light-blocking by the sensing electrodes 19, luminance distribution mura occurs while the touchscreen is viewed at the side angle (off-axis).

FIG. 2 is a simulation result showing luminance distributions of the conventional touchscreen (a display panel with a touch sensor) of FIG. 1 and a display panel. For the display panel (without touch sensor), the luminance distributions is a smooth curve, exhibiting decrease of the luminance with increase of viewing angle (Theta; angle to normal-axis). Although the luminance distributions of the conventional touchscreen of FIG. 1 shows the similar tendency as the display panel (without touch sensor), it is an uneven curve because of interference of sensing electrodes 19 and the black matrix layer 133 in display; therefore, luminance distribution mura will be visually observed during off-axis viewing.

SUMMARY

The disclosure is directed to a display apparatus with a symmetric diffusion film (SDF). A display apparatus having a touch sensor of the embodiment utilizes the SDF to solve the problem of luminance distribution mura, thereby improving the quality of the images presented on the display apparatus.

According to one embodiment, a display apparatus is provided, at least comprising a touchscreen, and a symmetric diffusion film (SDF), disposed above the touchscreen. The SDF comprises at least two different materials, including a first material mixed with a second material. The first material has a first refractive index and the second material has a second refractive index, and the first refractive index is different from the second refractive index. In one embodiment, the display apparatus further comprises a backlight module disposed beneath the touchscreen for emitting light passing through the touchscreen and the SDF. In one embodiment, the backlight module emitting a collimated light is adopted for increasing the brightness of the display apparatus.

The disclosure will become apparent from the following detailed description of the preferred but non-limiting embodiments. The following description is made with reference to the accompanying drawings.

BRIEF DESCRIPTION OF THE DRAWINGS

FIG. 10A shows the iso-luminance contours of a conventional touchscreen.

FIG. 10B shows the iso-luminance contours of a display apparatus according to the first embodiment.

FIG. 10C shows the iso-luminance contours of a display apparatus according to the second embodiment.

Figure 1:
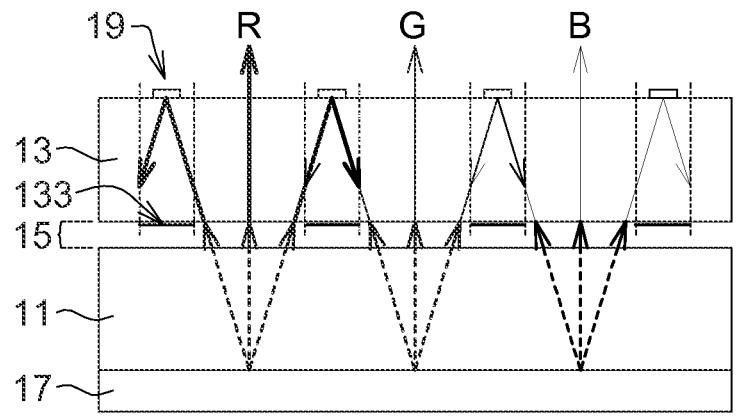
FIG. 1 schematically illustrates a conventional touchscreen having a touch sensor integrated to a display panel.
Figure 2:
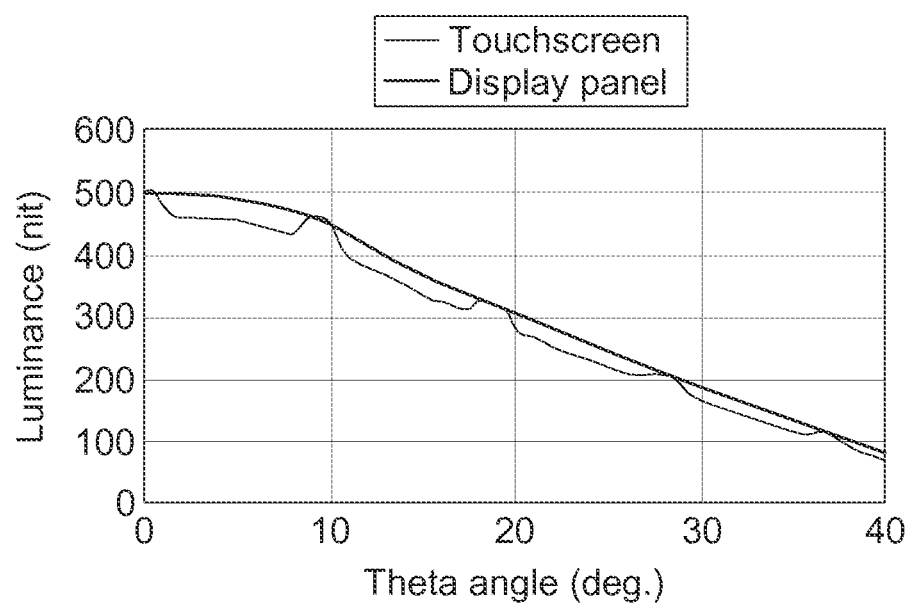
FIG. 2 is a simulation result showing luminance distributions of the conventional touchscreen of FIG. 1 and a display panel.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The embodiments of the present disclosure provide a display apparatus with a symmetric diffusion film (SDF), particularly a display apparatus having a touch sensor applied with the SDF. One display apparatus with a touch sensor of the embodiments, such as liquid crystal display (LCD), OLED or other types of display, utilizes a symmetric diffusion film (SDF) to provide a smooth curve of luminance distribution to viewing angles. The display apparatuses of the embodiments have simple structural constructions and can be manufactured with low cost of fabrication. Therefore, the display apparatuses of the embodiments are suitable for mass productions. The display apparatuses of the embodiments solve the problem of luminance distribution mura occurring at the off-axis viewing angles which the traditional touch displays have. Thus, the qualities of the images presented on the display apparatuses provided according to the embodiments have been greatly improved. Also, no compensation film is further required to incorporate into the display apparatuses of the embodiments for eliminating luminance distribution mura. In another embodiment, a collimated light can be further adopted for increasing the brightness of the display apparatus.

The display apparatuses with touch sensors according to the embodiments can be widely used in a variety of applications, such as transmissive, reflective, and transflective types of LCDs, OLEDs, or other types of displays. It is also applicable for different types of touchscreens, such as In-Cell, On-Cell, and Out-Cell touchscreens.

Some embodiments of the present disclosure are described more details hereinafter with reference to the accompanying drawings, in which some, but not intended to limit the disclosure. It is noted that not all embodiments of the invention are shown. Various embodiments of the disclosure may be embodied in many different forms (ex: different types of displays and touch sensors; different integrations of the touch sensors), and should not be construed as limited to the embodiments set forth herein. Modifications and variations can be made without departing from the spirit of the disclosure to meet the requirements of the practical applications.

First Embodiment

Display Apparatus with Touchscreen and SDF

Figure 3A:
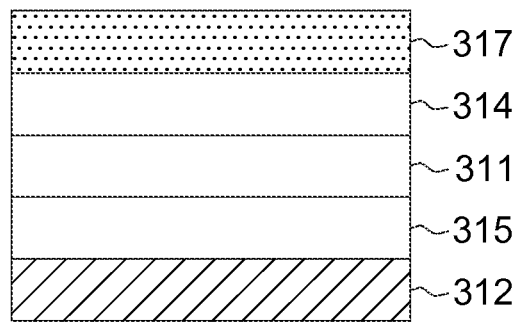
FIG. 3A and FIG. 3B schematically illustrate two types of display apparatuses according to the first embodiment of the present disclosure.
Figure 3B:
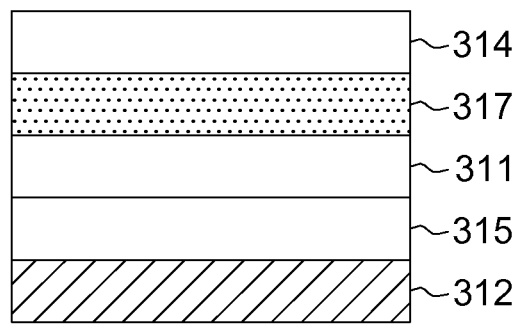

FIG. 3A and FIG. 3B schematically illustrate two types of display apparatuses according to the first embodiment of the present disclosure. In the first embodiment, the transmissive types of LCDs are used for simple illustration.

A display apparatus 31 or 31' of the first embodiment comprises a touchscreen 311, a backlight module 312 disposed under the touchscreen 311 for providing a light towards the touchscreen 311, an upper polarizer 314, a lower polarizer 315, and a symmetric diffusion film (SDF) 317 disposed at one side of the upper polarizer 314. The touchscreen 311 is disposed between the lower polarizer 315 and the upper polarizer 314. The upper polarizer 314 and the lower polarizer 315 are crossed relative to one another to provide a cross-polarization effect. The structural difference between the display apparatus 31 or 31' is the position of the SDF 317 (i.e. respectively disposed above and beneath the upper polarizer 314). In FIG. 3A, the SDF 317 is disposed at the top (i.e. front surface) of the upper polarizer 314. In FIG. 3B, the SDF 317 is disposed at the rear surface of the upper polarizer 314, and sandwiched between the upper polarizer 314 and the touchscreen 311. In FIG. 3A, the light emitted from the backlight module 312 passes the lower polarizer 315, the touchscreen 311, the upper polarizer 314, and scattered by the SDF 317. In FIG. 3B, the light emitted from the backlight module 312 passes the lower polarizer 315, the touchscreen 311, scattered by the SDF 317, and the upper polarizer 314.

Figure 4:
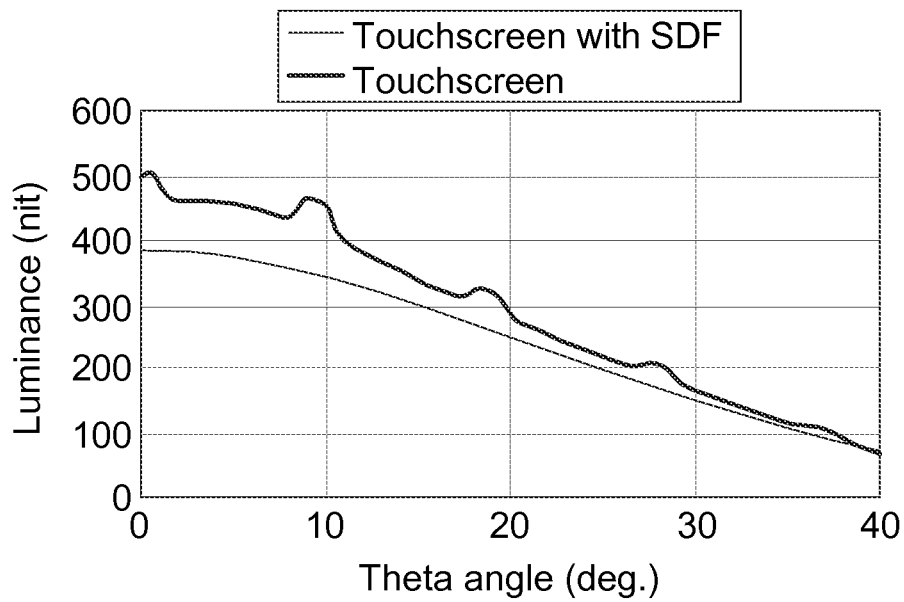
FIG. 4 is a simulation result showing luminance distributions of a conventional touchscreen and a display apparatus of the first embodiment.

FIG. 4 is a simulation result showing luminance distributions of a conventional touchscreen and a display apparatus of the first embodiment. A touchscreen with the SDF is conducted in the simulation as one of the first embodiment. The same backlight modules are adopted for the conventional touchscreen and the first embodiment (a touchscreen with the SDF). Both of luminance distribution curves show the similar tendency that the luminance is decreased with the increase of the viewing angle (Theta; angle to normal-axis). However, the luminance distribution curve of the conventional touchscreen is uneven, while the luminance distribution curve of the display apparatus of the first embodiment is smooth, as shown in FIG. 4. When a viewer watches the conventional touchscreen, the luminance distribution mura will be visually observed during off axis viewing. According to the first embodiment, the display apparatuses having touchscreen with SDF present no luminance distribution mura. Thus, the displaying qualities of the display apparatuses according to the first embodiment have been greatly improved.

According to one of the embodiments, the SDF comprises at least two different materials, including a first material having a first refractive index mixed (or blended) with a second material having a second refractive index, and the first refractive index n1 is different from the second refractive index n2. In one embodiment, the difference between the first refractive index n1 and the second refractive index n2 is larger than 0 and no more than 0.1. The second material can be configured as particles and distributed in the first material. Particle size of the second material can be in a range of 0.1 μm to 10 μm.

Figure 5:
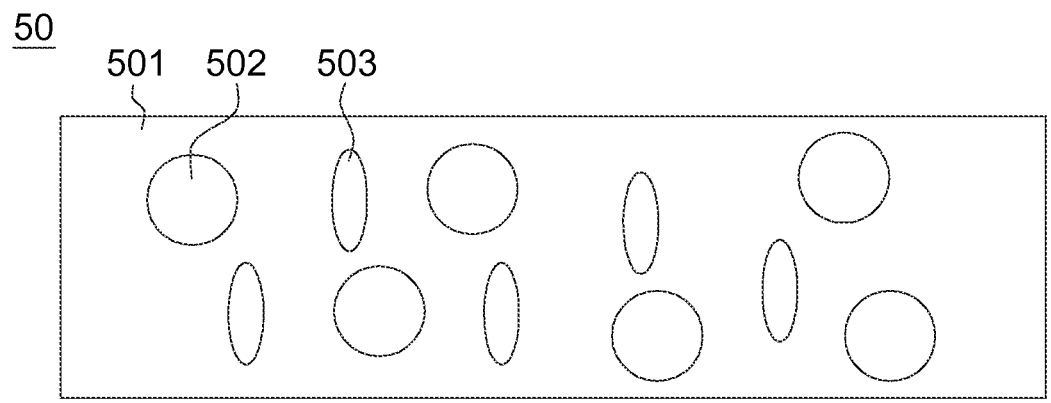
FIG. 5 schematically illustrates a SDF according to one embodiment of the present disclosure.

FIG. 5 schematically illustrates a SDF according to one embodiment of the present disclosure. The SDF 50 of FIG. 5 comprises three different materials, including the first material 501 having a first refractive index n1, a second material 502 having a second refractive index n2, and a third material 503 having a third refractive index n3. The third refractive index n3 is different from the first index n1 and the second index n2. The second material 502 and the third material 503 are configured as the particles distributed in the first material 501. The difference between the third refractive index n3 and the second refractive index n2 or the difference between the third refractive index n3 and the first refractive index n1 is within 0.1. Examples of particle size of the third material are in a range of 0.1 µm to 10 µm. Examples of refractive indexes of the SDF materials include n1=1.6 and n2=1.5, n1=1.5 and n2=1.6, n1=1.6, n2=1.5 and n3=1.4.

In one embodiment, the first material 501 can be organic materials, such as glue, adhesive or resin (ex. polyethylene terephthalate, PET). The second material 502 and the third material 503 may be independently selected from the inorganic materials (such as glass (SiOx), SiNx), and transparent conductive materials (such as Indium-Tin Oxide (ITO), In—Al—Zn—O (IAZO), In—Ga—Zn—O (IGZO)). Also, a thickness of the SDF 50 of one embodiment is, but not limited to, between 20 µm and 200 µm.

In one embodiment, a haze of the SDF 50 is at least about 50% (i.e. in a range of 50% to 95%). Addition of SDF 50 is able to diffuse the light that is transmitted through the SDF 50. In one embodiment, at least 50% of the light are scattered over ±2 degrees to ±10 degrees (i.e. HWHM value) of the SDF 50.

Many different methods can be applied for manufacturing SDF, and the disclosure is not limited to a particular one. In one embodiment, the SDF 50 can be formed by distributing the particles of the second material and the third material into the first material, and then the first material is cured to be mixed with the particles of the second material and the third material. For example, an organic material (such as glue, adhesive, PET . . . ) is liquefied at a sufficiently high temperature, and the particles of the second material and/or the third material are added into the melted organic material, and then stirred to combine evenly. The mixture is then cured for solidification.

Second Embodiment

Display Apparatus with Touchscreen, SDF and Collimated Backlight

Figure 6A:
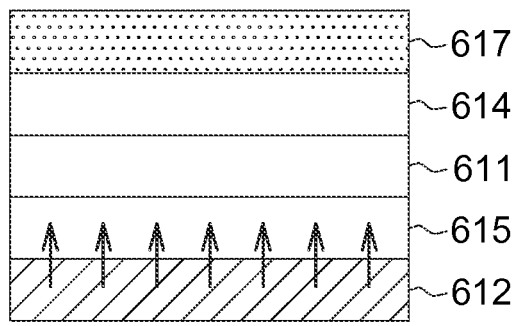
FIG. 6A and FIG. 6B schematically illustrate two types of display apparatuses according to the second embodiment of the present disclosure.
Figure 6B:
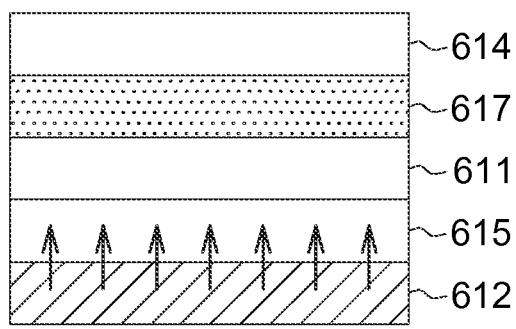

FIG. 6A and FIG. 6B schematically illustrates two types of display apparatuses according to the second embodiment of the present disclosure. In the second embodiment, the transmissive types of LCDs are also used for simple illustration.

A display apparatus 61 or 61' of the second embodiment comprises a touchscreen 611, a collimated backlight module 612 disposed under the touchscreen 611 for providing a collimated light towards the touchscreen 611, an upper polarizer 614, a lower polarizer 615, and a symmetric diffusion film (SDF) 617 disposed at one side of the upper polarizer 614. Similarly, the touchscreen 611 is disposed between the lower polarizer 615 and the upper polarizer 614, and combination of the upper polarizer 614 and the lower polarizer 615 provides a cross-polarization effect. The structural difference between the display apparatus 61 and 61' is the position of the SDF 617. In FIG. 6A, the SDF 617 is disposed above (ex: at the front surface) of the upper polarizer 614. In FIG. 6B, the SDF 617 is disposed beneath (ex: at the rear surface) the upper polarizer 614. In FIG. 6A, the collimated light emitted from the collimated backlight module 612 passes the lower polarizer 615, the touchscreen 611, the upper polarizer 614, and scattered by the SDF 617. In FIG. 6B, the collimated light emitted from the backlight module 612 passes the lower polarizer 615, the touchscreen 611, scattered by the SDF 617, and the upper polarizer 614.

Configurations, materials, refractive indexes of materials and fabrications of the SDF, have been described in the first embodiment, which are not redundantly repeated here.

Figure 7:
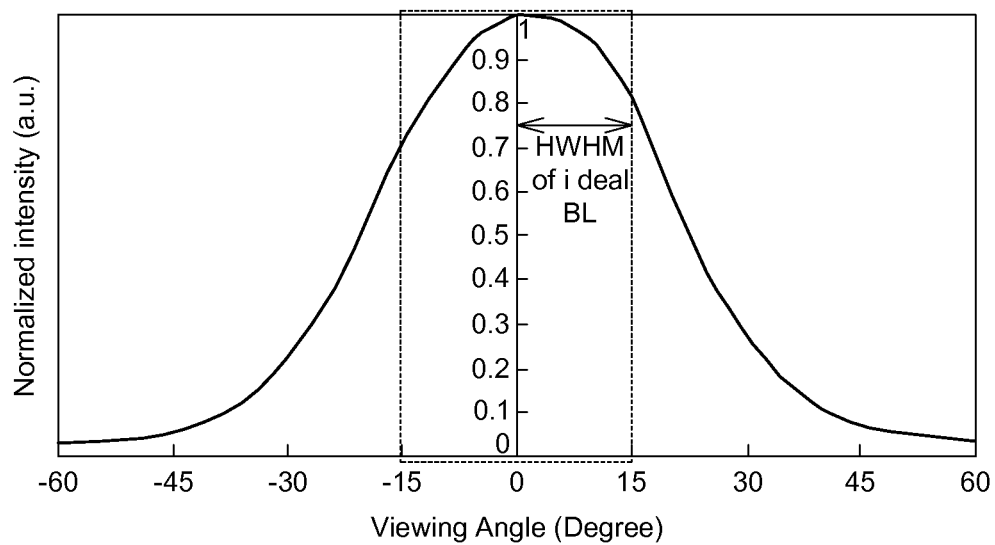
FIG. 7 shows relationships between normalized light intensity and viewing angle of a collimated backlight emitted from a backlight module of the display apparatus according to the second embodiment of the present disclosure.

FIG. 7 shows relationships between normalized light intensity and viewing angle of a collimated backlight emitted from a backlight module of the display apparatus according to the second embodiment of the present disclosure. The collimated backlight module 612 of the second embodiment disposed under the touchscreen 611 provides a collimated light towards the touchscreen. According to one embodiment, a half-width at half-maximum (HWHM) of the collimated light is in a range of 5 degrees to 20 degrees, approximately.

In the second embodiment, the collimated light emitted from the collimated backlight module 612 passes the lower polarizer 615, the touchscreen 611, the upper polarizer 614, and scattered by the SDF 617 (disposed at one side of the upper polarizer 614).

Figure 8:
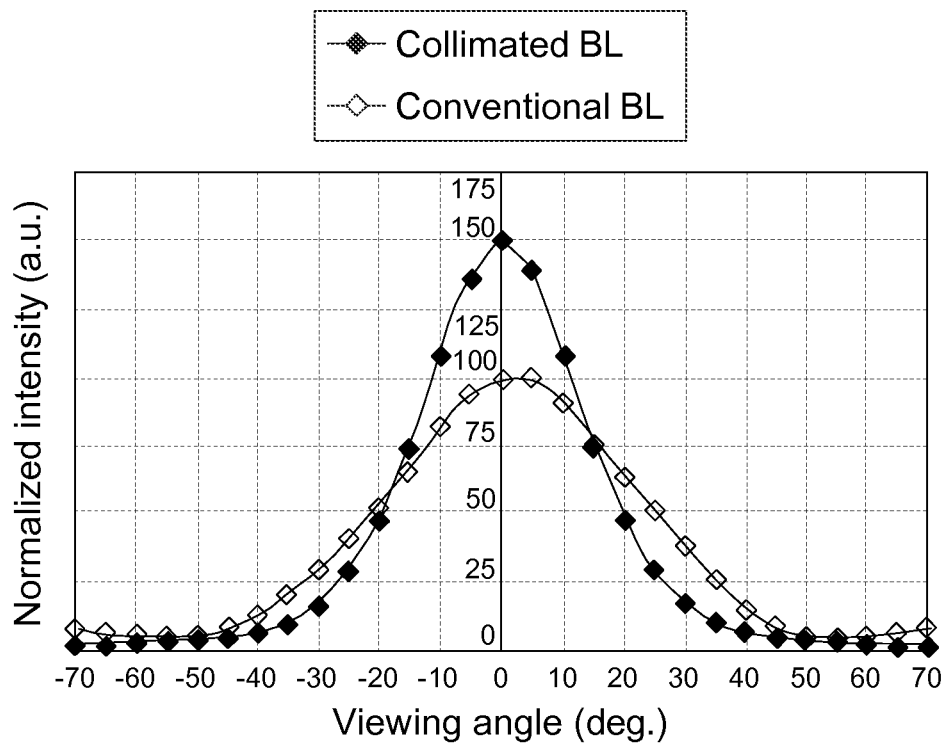
FIG. 8 shows relationships between normalized light intensity and viewing angle for a conventional backlight and a collimated backlight.

FIG. 8 shows relationships between normalized light intensity and viewing angle for a conventional backlight and a collimated backlight. As shown in FIG. 8, the luminance at off-axis (ex: larger than 20 degrees of viewing angle) of the collimated backlight is reduced. The luminance at normal-axis of the collimated backlight according to the second embodiment has been enhanced, for about 1.5 times than that of the conventional backlight.

Furthermore, in practical applications, the values of HWHM of the SDF 617 may be determined and affected by the HWHM of the collimated backlight emitted from the selected backlight module. In one embodiment, the HWHM of the SDF 617 is under 13.5 degrees when the HWHM of the collimated backlight is 20 degrees. It is noted that the values are described merely for exemplification, and the disclosure is, of course, not limited to the proposed values of HWHM.

Figure 9:
FIG. 9 is a simulation result showing luminance distributions of a conventional touchscreen and a display apparatus according to the second embodiment.

FIG. 9 is a simulation result showing luminance distributions of a conventional touchscreen and a display apparatus according to the second embodiment. A display apparatus with touch sensor, SDF and a collimated backlight module is conducted in the simulation as one of the second embodiment. Both of luminance distribution curves show the similar tendency that the luminance is decreased with the increase of the viewing angle (Theta; angle to normal-axis). However, the luminance distribution curve of conventional touchscreen is uneven, while the luminance distribution curve of the display apparatus of the second embodiment is smooth. Furthermore, the luminance at the normal-axis of the collimated backlight according to the second embodiment has been enhanced (ex: about 600 nits) than that of the conventional backlight (ex: about 500 nits), as shown in FIG. 9.

Also, three different display panels, including a conventional touchscreen, a display apparatus with touch sensor according to the first embodiment, and a display apparatus with touch sensor according to the second embodiment are further investigated to compare the luminance ratios, and the results are presented in FIG. 10A~FIG. 10C, respectively.

FIG. 10A shows the iso-luminance contours of a conventional touchscreen (without SDF and collimated backlight). For the conventional touchscreen, the brightness at 0 degree of viewing angle is about 532 nit. FIG. 10B shows the iso-luminance contours of a display apparatus according to the first embodiment (with a SDF and a conventional backlight). For the display apparatus of the first embodiment, the brightness at 0 degree of viewing angle (normal-axis) is about 357 nits. FIG. 10C shows the iso-luminance contours of a display apparatus with touch sensor according to the second embodiment (with a SDF and a collimated backlight). For the display apparatus of the second embodiment, the brightness at 0 degree of viewing angle (normal-axis) is about 557 nits. For the conventional touchscreen, the discrete island-shaped areas presented in the iso-luminance contours of FIG. 10A are associated with luminance distribution mura occurring at the off-axis viewing angles. The results have clearly indicated that the iso-luminance contours of the display apparatus according to the first and second embodiments are greatly improved, particularly at 0°-180° azimuth angle. Accordingly, it is proved that the display apparatuses of the embodiments (such as the first and second embodiments) do solve the issue of luminance distribution mura occurring at the off-axis viewing angles. Moreover, the brightness at 0 degree of viewing angle (normal-axis) of the display apparatus of the second embodiment is increased by incorporating a collimated backlight.

According to the embodiments described above, many different types of panels, such as transmissive/reflective/transflective types of LCDs, and OLEDs, can be applied as the touchscreen (311/611). It is also applicable for different types of touchscreen, such as In-Cell, On-Cell, and Out-Cell touchscreen. Further, the types, patterns, and materials of sensing electrodes of touchscreen of the embodiments are not limited. One embodiment is provided below for exemplifying an LCD panel with sensing electrodes. It is to be understood that the inventions are not to be limited to the specific embodiments disclosed, and that modifications and other embodiments are intended to be included within the scope of the appended claims.

Figure 11A:
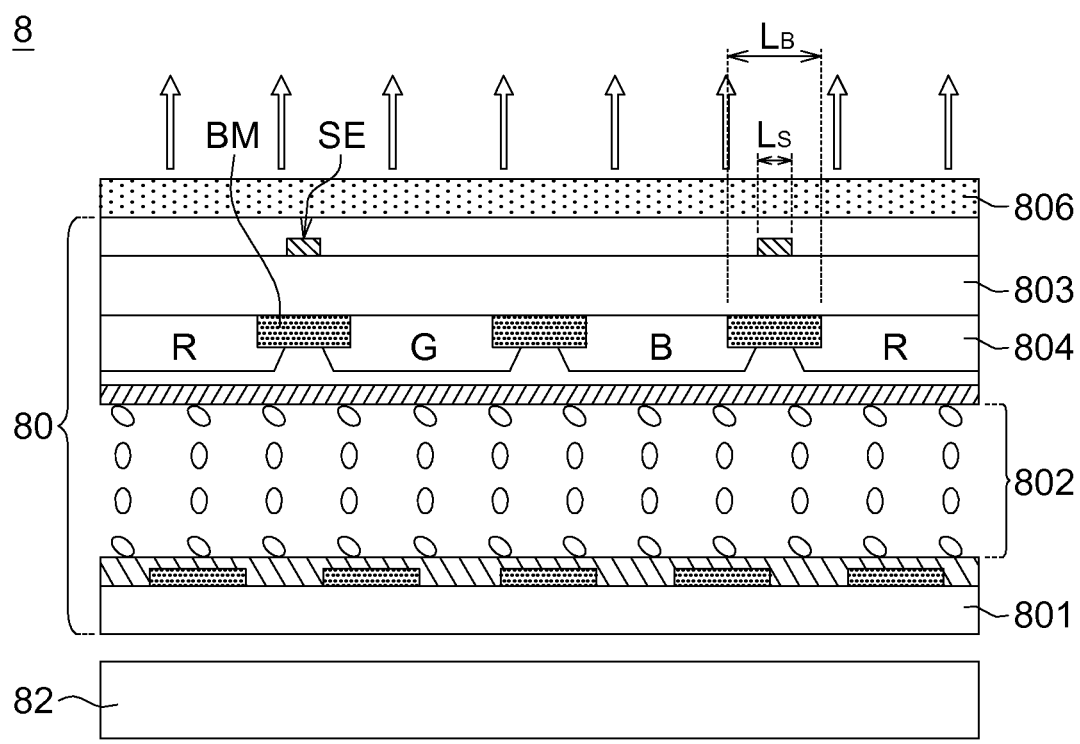
FIG. 11A schematically illustrates a display apparatus with sensing electrodes according to one embodiment of the disclosure.

FIG. 11A schematically illustrates a display apparatus with sensing electrodes according to one embodiment of the disclosure. According to one embodiment, a panel comprises a display module (displaying function) and a touch sensor coupled to the display module. As shown in FIG. 11A, a display module 80 of a display apparatus 8 comprises a first substrate having a TFT glass substrate 801, a second substrate having a CF glass substrate 803, and a display medium layer such as liquid crystal layer 802 disposed between the first and second substrates. A CF layer 804 and a black matrix layer (BM) are further formed on the CF glass substrate 803. Also, the display apparatus 8 of FIG. 11A further comprises a backlight module 82 disposed under the TFT glass substrate 801, and a symmetric diffusion film (SDF) 806 disposed at one side, such as on the top, of the upper polarizer of the display module 80. The backlight module 82 emits a conventional light (first embodiment) or a collimated light (second embodiment) towards the display module 80; also, the functions, materials, and positions of the SDF 806 are similar to the SDF in the aforementioned descriptions, which are not redundantly repeated.

In one embodiment, the touch sensor comprises sensing electrodes layer (SE) with a pattern (i.e. an electrode mesh) corresponding to the black matrix (BM) layer. The sensing electrode layer can be made of metal mesh.

Figure 11B:
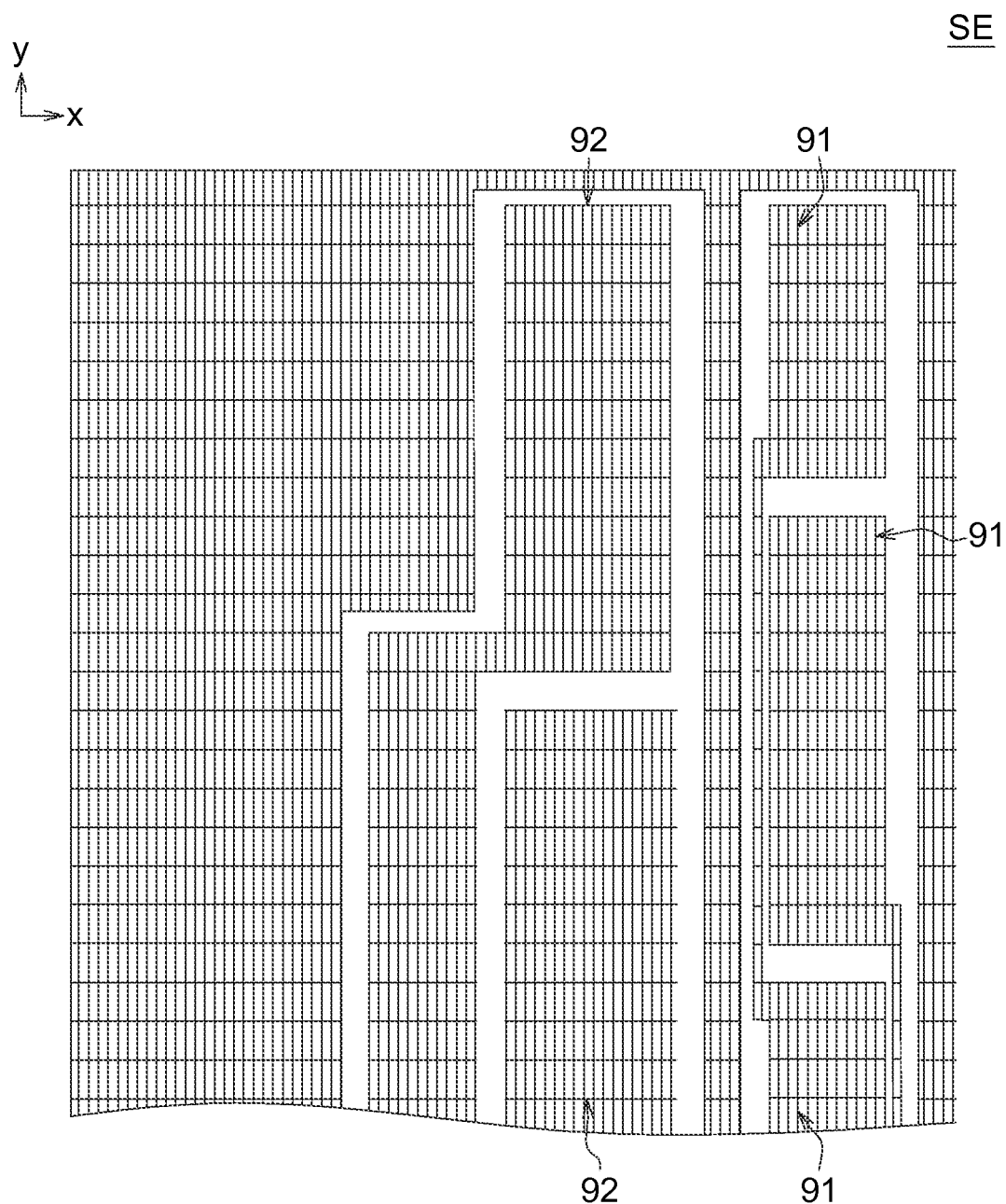
FIG. 11B schematically illustrates an electrode pattern of the touch sensor according to one embodiment of the disclosure.

FIG. 11B schematically illustrates an electrode pattern of the touch sensor according to one embodiment of the disclosure. As shown in FIG. 11B, the touch sensor of one embodiment includes a sensing electrode layer comprising a plurality of first electrodes 91, and a plurality of second electrodes 92. In one embodiment, the first and second electrodes can be made of a same layer. The first electrodes 91 and the second electrodes 92 are insulated (electrically) and isolated (structurally) from each other.

In one embodiment, the electrode layers of the touch sensor are TX-RX capacitive sensor elements, wherein the first electrodes 91 are receiver electrodes (RX), and the second electrodes 92 are transmitter electrodes (TX). The first electrodes 91 or the second electrodes 92 can be connected respectively by a plurality of conductive bridges. In this embodiment, the first electrodes 91 or the second electrodes 92 are made of a same layer and directly connected respectively without the conductive bridges. Each of the sensor elements, including the transmitter electrodes (ex: 92) and receiver electrodes (ex: 91), has a parasitic capacitance and a mutual capacitance. The parasitic capacitance of a sensor element is the capacitance between the sensor element and ground. The mutual capacitance of the sensor element is the capacitance between the sensor element and other sensor elements. In one embodiment for using a capacitive sensor having transmitter and receiver electrodes, a signal applied to a transmitter electrode induces a current at a receiver electrode due to capacitive coupling between the transmitter and receiver electrodes.

In one embodiment, a capacitance sensing circuit detects an input at the capacitive sensor by detecting a change in the capacitance of a sensor element. When a finger is placed close to a sensor element, the capacitance of the sensor element, as well as the capacitance between the electrodes and ground may be changed consequently, and the magnitude of these changes in capacitance can be detected and converted to a voltage level or a digital code by a processing unit or other circuit.

In one embodiment, the first electrodes (ex: receiver electrodes) 91 and the second electrodes (ex: transmitter electrodes) 92 are made of metal mesh. In one embodiment, the pattern of the electrode mesh is corresponding to the pattern of the black matrix layer (BM). In one embodiment, a line width $L_S$ of one of the sensing electrode layer (SE) is no more than a width $L_B$ of the black matrix layer (BM). In one embodiment, a line width $L_S$ of one of the sensing electrode layer (SE) is less than a width $L_B$ of the black matrix layer (BM), as shown in FIG. 11A.

Although FIG. 11A depicts the black matrix layer (BM) and the sensing electrode layer (SE) (ex: the first electrodes 91 and the second electrodes 92) are positioned at different sides of the CF glass substrate 803, the disclosure is not limited thereto. In another embodiment, the sensing electrode layer (SE) and the black matrix layer (BM) may be positioned at the same side of the CF glass substrate 803.

Furthermore, although FIG. 11A depicts the sensing electrode layer (SE) is positioned above the black matrix layer (BM), the disclosure is not limited thereto. In another embodiment, the sensing electrode layer (SE) may be disposed beneath the black matrix layer (BM). Other modification and embodiments with varied combinations of elements and/or functions may be provided without departing from the scope of the appended claims.

Furthermore, although FIG. 11A depict the display apparatus with the black matrix layers (BM), the disclosure is not limited thereto. Other embodiments without forming BM are also applicable, wherein a diffuser film may be further disposed above the SDF 806 for blurring the sensing electrode layer (SE) of the touch sensor in visual. Other modification and embodiments with varied combinations of elements and/or functions may be provided without departing from the scope of the appended claims.

According to the aforementioned descriptions, the display apparatuses with touch sensors of the embodiments utilize a symmetric diffusion film (SDF), thereby creating smooth curve of luminance distribution to viewing angles, and solving the problem of luminance distribution mura. Thus, the display qualities of the display apparatuses of the embodiments have been greatly improved. Also, the display apparatuses of the embodiments have simple structures, which can be manufactured with low cost of fabrication. Therefore, the display apparatuses of the embodiments are suitable for mass productions.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display apparatus, comprising:
a touchscreen; and
a symmetric diffusion film (SDF), disposed above the touchscreen, and the SDF comprising at least two different materials, including a first material mixed with a second material, and the first material having a first refractive index while the second material having a second refractive index, wherein the first refractive index is different from the second refractive index, and wherein a half-width at half-maximum (HWHM) of the SDF for scattering light in a range of 2 degrees to 10 degrees.

2. The display apparatus according to claim 1, further comprising a backlight module, disposed beneath the touchscreen for emitting light passing through the touchscreen and the SDF.

3. The display apparatus according to claim 2, wherein the backlight module provides a collimated light towards the touchscreen and the SDF.

4. The display apparatus according to claim 3, wherein a half-width at half-maximum (HWHM) of the collimated light is in a range of 5 degrees to 20 degrees.

5. The display apparatus according to claim 2, further comprising an upper polarizer and a lower polarizer, respectively disposed above and beneath the touchscreen, wherein the backlight module is disposed beneath the lower polarizer.

6. The display apparatus according to claim 5, wherein the SDF is disposed above the upper polarizer.

7. The display apparatus according to claim 1, wherein a haze of the SDF is in a range of 50% to 95%.

8. The display apparatus according to claim 1, wherein the touchscreen comprises a display module and a touch sensor coupled to the display module, wherein the display module comprises a first substrate, a second substrate and a display medium layer disposed therebetween.

9. The display apparatus according to claim 8, wherein the touch sensor at least comprises:
a sensing electrode layer, comprising a plurality of first electrodes and
a plurality of second electrodes, wherein the first and second electrodes are made by a same layer and insulated from each other.

10. The display apparatus display according to claim 1, wherein the difference between the first refractive index and the second refractive index of the SDF is larger than 0 and no more than 0.1.

11. The display apparatus according to claim 1, wherein the second material of the SDF is configured as a plurality of particles sized in a range of 0.1 µm to 10 µm and distributed in the first material.

12. The display apparatus according to claim 1, wherein the first material of the SDF is an organic material, and the second material of the SDF is an inorganic material or a transparent conductive material.

13. The display apparatus according to claim 1, wherein the first material of the SDF is an adhesive or resin.

14. The display apparatus according to claim 1, wherein a thickness of the SDF is between 20 µm and 200 µm.

15. A display apparatus, comprising:
a touchscreen;
a symmetric diffusion film (SDF), disposed above the touchscreen, and the SDF comprising at least two different materials, including a first material mixed with a second material, and the first material having a first refractive index while the second material having a second refractive index, wherein the first refractive index is different from the second refractive index;
a backlight module, disposed beneath the touchscreen for emitting light passing through the touchscreen and the SDF; and
an upper polarizer and a lower polarizer, respectively disposed above and beneath the touchscreen wherein the backlight module is disposed beneath the lower polarizer,
wherein the SDF is disposed between the upper polarizer and the touchscreen.

16. A display apparatus, comprising:
a touchscreen comprising a display module and a touch sensor coupled to the display module, wherein the display module comprises a first substrate, a second substrate and a display medium layer disposed between the first substrate and the second substrate; and
a black matrix layer on one side of the second substrate, wherein the touch sensor comprises a sensing electrode layer with a pattern corresponding to the black matrix layer; and
a symmetric diffusion film (SDF), disposed above the touchscreen, and the SDF comprising at least two different materials, including a first material mixed with a second material, and the first material having a first refractive index while the second material having second refractive index, wherein the first refractive index is different from the second refractive index.

17. The display apparatus according to claim 16, wherein a line width of the sensing electrode layer is no more than a width of the black matrix layer.

18. The display apparatus according to claim 16, wherein the sensing electrode layer is made of metal mesh.

19. The display apparatus according to claim 16, wherein the sensing electrode layer and the black matrix layer are positioned at different sides of the second substrate.

* * * * *